(12) United States Patent
Ikeda

(10) Patent No.: US 7,619,679 B2
(45) Date of Patent: Nov. 17, 2009

(54) IMAGE PICKUP APPARATUS HAVING IRIS MEMBER AND FILTER UNITS

(75) Inventor: Takeshi Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 401 days.

(21) Appl. No.: 11/626,591

(22) Filed: Jan. 24, 2007

(65) Prior Publication Data

US 2007/0120998 A1 May 31, 2007

Related U.S. Application Data

(62) Division of application No. 10/632,958, filed on Aug. 4, 2003, now Pat. No. 7,365,791.

(30) Foreign Application Priority Data

Aug. 8, 2002 (JP) ............................. 2002-231302

(51) Int. Cl.
*H04N 5/225* (2006.01)
(52) U.S. Cl. ..................................... 348/360; 348/220.1
(58) Field of Classification Search ............. 348/220.1, 348/221.1, 342, 360, 361
See application file for complete search history.

(56) References Cited

U.S. PATENT DOCUMENTS

| 4,739,411 A | 4/1988 | Bolton |
| 4,827,348 A | 5/1989 | Ernest et al. ................. 358/228 |
| 5,440,343 A | 8/1995 | Parulski et al. |
| 6,342,922 B1* | 1/2002 | Mizoguchi .................. 348/355 |
| 6,771,315 B1 | 8/2004 | Nanjo et al. ................. 348/362 |
| 2007/0065135 A1 | 3/2007 | Takei et al. ................. 396/241 |

FOREIGN PATENT DOCUMENTS

| EP | 0 340 678 | 11/1989 |
| JP | 1-307375 | 12/1989 |
| JP | 2000-10150 | 1/2000 |
| JP | 2000-010150 | 1/2000 |
| JP | 2000-106649 | 4/2000 |
| JP | 2002-14384 | 1/2002 |
| JP | 2002-014384 | 1/2002 |

* cited by examiner

*Primary Examiner*—Timothy J Henn
(74) *Attorney, Agent, or Firm*—Fitzpatrick, Cella, Harper & Scinto

(57) ABSTRACT

An image pickup apparatus capable of preventing a decline of resolution of a still image while keeping a dynamic range of exposure control. The image pickup apparatus capable of photographing with changing over a moving image and a still image, includes an iris mechanism for changing an amount of light input to an image pickup element by changing an aperture diameter, a filter unit, having a single density or a plurality of densities, for changing the amount of the light input to the image pickup element by its advancing towards and withdrawing from the aperture diameter of the iris mechanism, a unit for driving the iris mechanism and the filter unit independently, and a control unit for setting the filter unit in one of two types of states such as fully covering the aperture diameter of the iris mechanism and fully withdrawing from the aperture diameter in the still image photography.

4 Claims, 9 Drawing Sheets

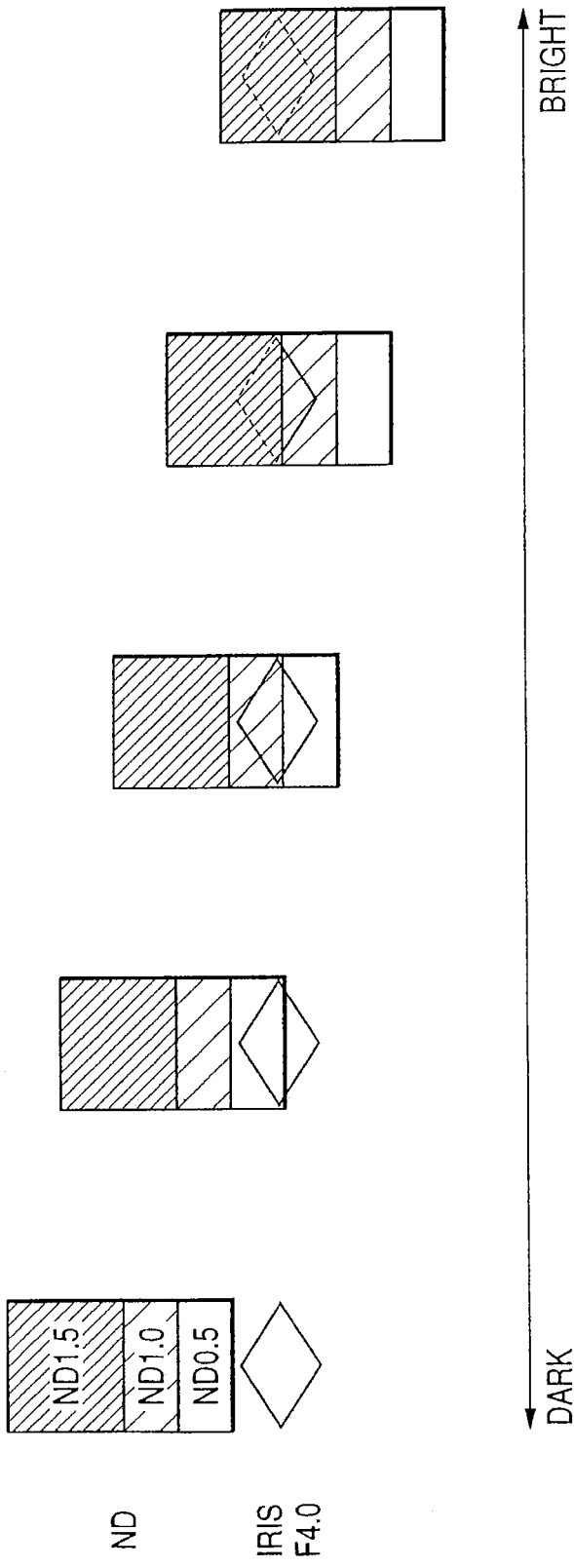

IMAGE PICKUP APPARATUS HAVING IRIS MEMBER AND FILTER UNITS

This is a divisional of U.S. patent application Ser. No. 10/632,958, filed Aug. 4, 2003, now U.S. Pat. No. 7,365,791, issued Apr. 29, 2008.

BACKGROUND OF THE INVENTION

1. Field of the Invention

The present invention relates to an image pickup apparatus having an iris member and filter units.

2. Related Background Art

The following is an example of a conventional technology in this category of field.

FIG. 8 is a block diagram showing a configuration of a conventional image pickup apparatus.

Referring to FIG. 8, there are shown a lens 1 for forming an image of an object, an iris mechanism 2 for controlling an amount of incident light, an iris driving motor 3 for driving (moving) the iris mechanism 2, an iris mechanism drive device for driving the iris driving motor 3, an iris state detecting device for detecting a state of the iris mechanism 2, an ND filter 6 for controlling the amount of the incident light, an ND driving motor 7 for driving the ND filter 6, an ND mechanism drive device 8 for driving the ND driving motor 7, and an ND state detection device 9 for detecting a state of the ND mechanism (filter) unit 6.

There are further shown a CCD (Charge-Coupled Device) 10 for performing a photoelectric conversion of the incident light, an image pickup element drive device 11 for controlling the CCD 10 to read photoelectrically converted signals and controlling a signal accumulation time, i.e., controlling a so-called electronic shutter function, a CDS/AGC 12 for sampling the photoelectrically converted signals and electrically amplifying the signals, an analog-to-digital converter (which will be hereinafter be abbreviated to an A/D converter) 13 for converting an analog signal as an output of the CDS/AGC 12 into a digital signal, a signal processing device (which will hereinafter be called a DSP) 14 having a control function of executing processing such as a color separation, a color difference matrix, etc. after a gamma correction and thereafter generating standard TV signals by adding synchronous signals, a memory 15 for storing an image processed by DSP 14, a recording medium 16 capable of recording still images and image information thereof, a microcomputer 17 for issuing processing commands to the DSP 14, and a liquid crystal panel 18 for displaying the image.

Next, a method of controlling the iris mechanism 2 and the ND filter 6 will be discussed.

The light incident on the lens 1 travels through the iris mechanism 2 and the ND filter 6, and the light restricted by these optical elements enters the CCD 10. Signals photoelectrically converted by the CCD 10 are converted into the digital signals by the A/D converter 13 cooperating with the CDS/AGC 12 and are objected to camera-signal-processing in the DSP 14. The DSP 14 transmits luminance data corresponding to an exposure control frame to the microcomputer 17, wherein a calculation for the exposure control is made based on the luminance data. If a result of this calculation is not proper to the exposure, the iris mechanism 2, the ND filter 6, the electronic shutter and the AGC are controlled so that the calculation result becomes proper.

Among these four exposure control parameters, a control relationship between the iris mechanism 2 and the ND filter 6 will be explained. To start with, when controlling the exposure in such a direction as to reduce the incident light from a state where the iris mechanism 2 remains open and the ND filter 6 entirely withdraws from an aperture diameter of the iris mechanism 2, the iris mechanism 2 closes up (stops down) to a certain aperture diameter, and, after this aperture diameter of the iris mechanism 2 has been fixed, the ND filter 6 is consecutively advanced stepwise, thereby controlling the exposure with the ND filter 6 (see FIGS. 9A to 9E).

What has been required of the exposure control of the conventional image pickup apparatus is given as follows. This will be explained referring to FIGS. 9A to 9E.

Under the conventional exposure control, as shown in FIG. 9B, the ND filter 6 is advanced halfway such as only by a half-insertion towards the aperture of the iris mechanism and, as shown in FIGS. 9C and 9D, different-density areas of the ND filter 6 dually cover the aperture diameter of the iris mechanism 2.

As described above, if the ND filter 6 is advanced halfway towards the aperture diameter of the iris mechanism 2 or the different-density areas of the ND filter 6 cover the aperture diameter, there arises a problem in which an image resolution declines due to an occurrence of diffraction of the light that is caused by level differences both in thickness and in density of the ND filter 6. Therefore, the ND filter 6 cannot be inserted for still image photography that gives the priority to the image resolution so that a dynamic range of the exposure control decreases to an extent corresponding to a density of the ND filter 6 as compared with the moving image photography.

SUMMARY OF THE INVENTION

Accordingly, it is a primary object of the present invention to provide an image pickup apparatus capable of preventing a decline of a resolution of a still image while keeping a dynamic range of exposure control.

According to the present invention, the foregoing object is attained by providing an image pick apparatus capable of photographing with changing over a first mode for recording a plurality of frames and a second mode for recording one frame in accordance with a predetermined action, comprising an iris mechanism for changing an amount of light with which an image pickup element is irradiated, a filter unit for changing the amount of the light input, and a driving unit for driving the iris mechanism and the filter unit independently, wherein the driving unit drives the filter unit in different manners between the first mode and the second mode.

In one aspect of the present invention, an image pick apparatus capable of photographing with changing over a first mode for recording a plurality of frames and a second mode for recording one frame in accordance with a predetermined action, comprises an iris mechanism for changing an amount of light with which an image pickup element is irradiated, by changing an aperture diameter, a filter unit having a single density or a plurality of densities, for changing an amount of incident light, a unit for driving the iris mechanism and the filter unit independently, and a control unit for setting, in the second mode, the filter unit in one of states of covering an aperture diameter of the iris mechanism and of withdrawing from the aperture diameter of the iris mechanism.

In one aspect of the present invention, an image pick apparatus capable of photographing with changing over a first mode for recording a plurality of frames and a second mode for recording one frame in accordance with a predetermined action, comprising an iris mechanism for changing an amount of light with which an image pickup element is irradiated, by changing an aperture diameter, a filter unit, having a plurality of densities, for changing an amount of light input, a unit for driving the iris mechanism and the filter unit independently, and a control unit for performing drive control of the filter unit so that the filter unit is driven from the state in which a first density area of the filter unit is withdrawn from the aperture diameter of the iris mechanism to a state in which the first density area of the filter unit covers the aperture diameter when the aperture diameter of the iris mechanism is changed so as to be opened in the second mode and the aperture diameter reaches a predetermined aperture diameter.

In one aspect of the present invention, an image pick apparatus capable of photographing with changing over a first mode for recording a plurality of frames and a second mode for recording one frame in accordance with a predetermined action, comprising an iris mechanism for changing an amount of light with which an image pickup element is irradiated, by changing an aperture diameter, a filter unit, having a plurality of densities, for changing an amount of incident light, a unit for driving the iris mechanism and the filter unit independently, and a control unit for performing drive control of the filter unit so that the filter unit is driven from the state in which a first density area of the filter unit covers the aperture diameter of the iris mechanism to a state in which the first density area of the filter unit is withdrawn from the aperture diameter when the aperture diameter of the iris mechanism is driven so as to be closed up in the second mode and the aperture diameter reaches a predetermined aperture diameter.

In one aspect of the present invention, an image pickup apparatus comprising an iris mechanism for changing an amount of light with which an image pickup element is irradiated, a filter unit for changing the amount of the light, a unit for driving the iris mechanism and the filter unit independently, an image size changing unit for changing a size of an image to be captured, and a control unit for changing a driving method of the filter unit in accordance with the image size.

In one aspect of the present invention, an image pick apparatus capable of photographing with changing over a first mode for recording a plurality of frames and a second mode for recording one frame in accordance with a predetermined action, comprising an iris mechanism for changing an amount of light with which an image pickup element is irradiated, by changing an aperture diameter, a filter unit, having a plurality of densities, for changing an amount of light input, a unit for driving the iris mechanism and the filter unit independently, an image size changing unit for changing a size of an image to be photographed in the second mode, and a control unit for consecutively inserting or withdrawing the filter unit towards or from the aperture diameter of the iris mechanism in a case where a predetermined image size is designated by the image size changing unit.

In another aspect of the present invention, in the image pick apparatus, the control unit performs drive control of the filter unit so that the filter unit is driven so as to withdraw from the state of covering the aperture diameter when the aperture diameter of the iris mechanism is changed so as to be closed up in the second mode and the aperture diameter reaches a predetermined aperture diameter.

Other objects and advantages besides those discussed above shall be apparent to those skilled in the art from the description of a preferred embodiment of the invention which follows. In the description, reference is made to accompanying drawings, which form a part hereof, and which illustrate an example of the invention, Such example, however, is not exhaustive of the various embodiments of the invention, and therefore reference is made to the claims which follow the description for determining the scope of the invention.

BRIEF DESCRIPTION OF THE DRAWINGS

FIGS. 9A, 9B, 9C, 9D and 9E are diagrams showing how the exposure is controlled in the prior art.

DESCRIPTION OF THE PREFERRED EMBODIMENTS

Embodiments of the present invention will hereinafter be described with the accompanying drawings.

First Embodiment

Whole Configuration of Image Pickup Apparatus

Figure 1:
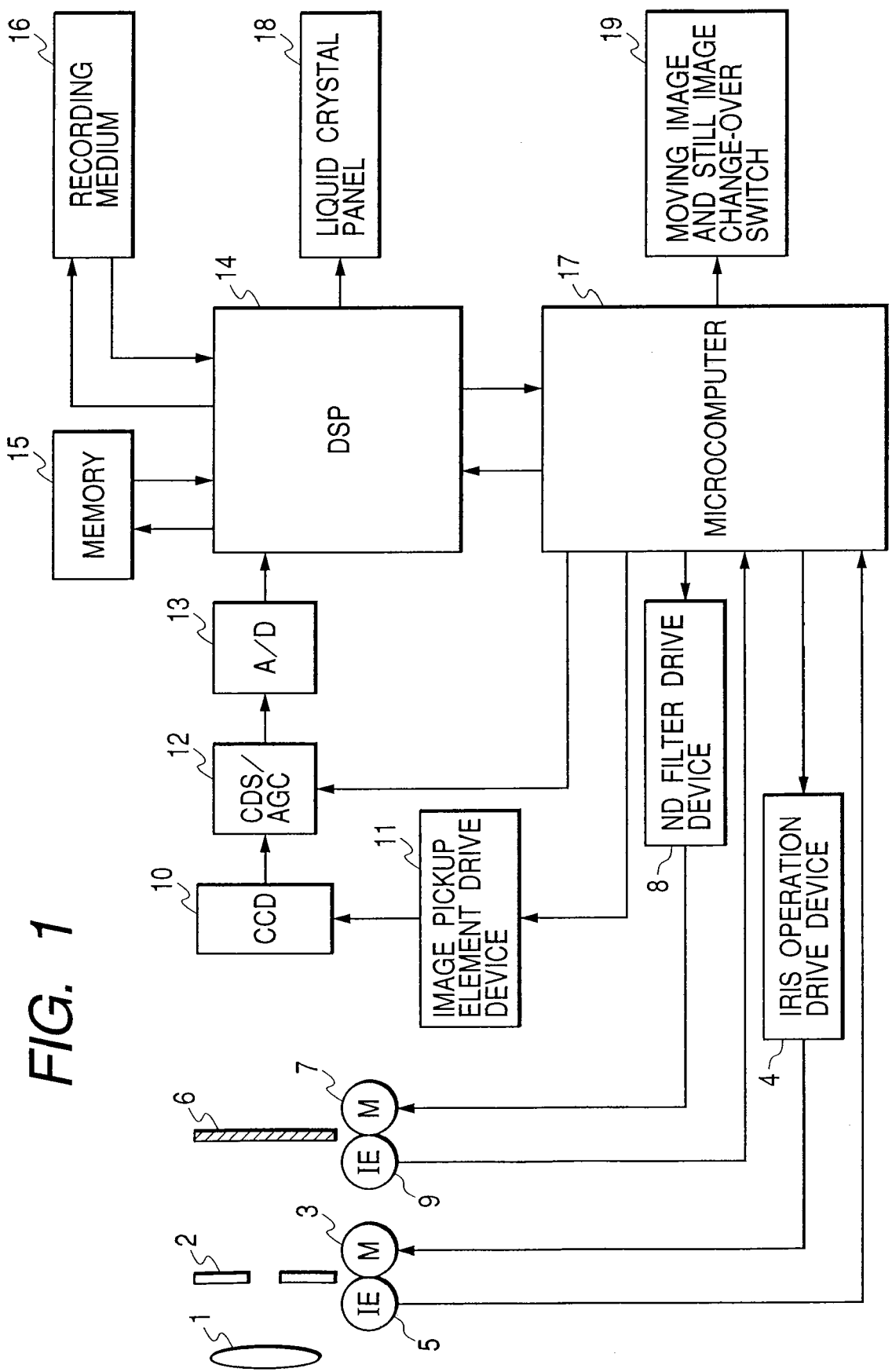
FIG. 1 is a block diagram showing a configuration of an image pickup apparatus in a first embodiment of the present invention.

FIG. 1 is a block diagram showing a configuration of an image pickup apparatus in one embodiment of the present invention. The components marked with the same numerals as those in FIG. 8 are component blocks having the same functions as those in the prior art, and hence their repetitive explanations are herein omitted.

Figure 8:
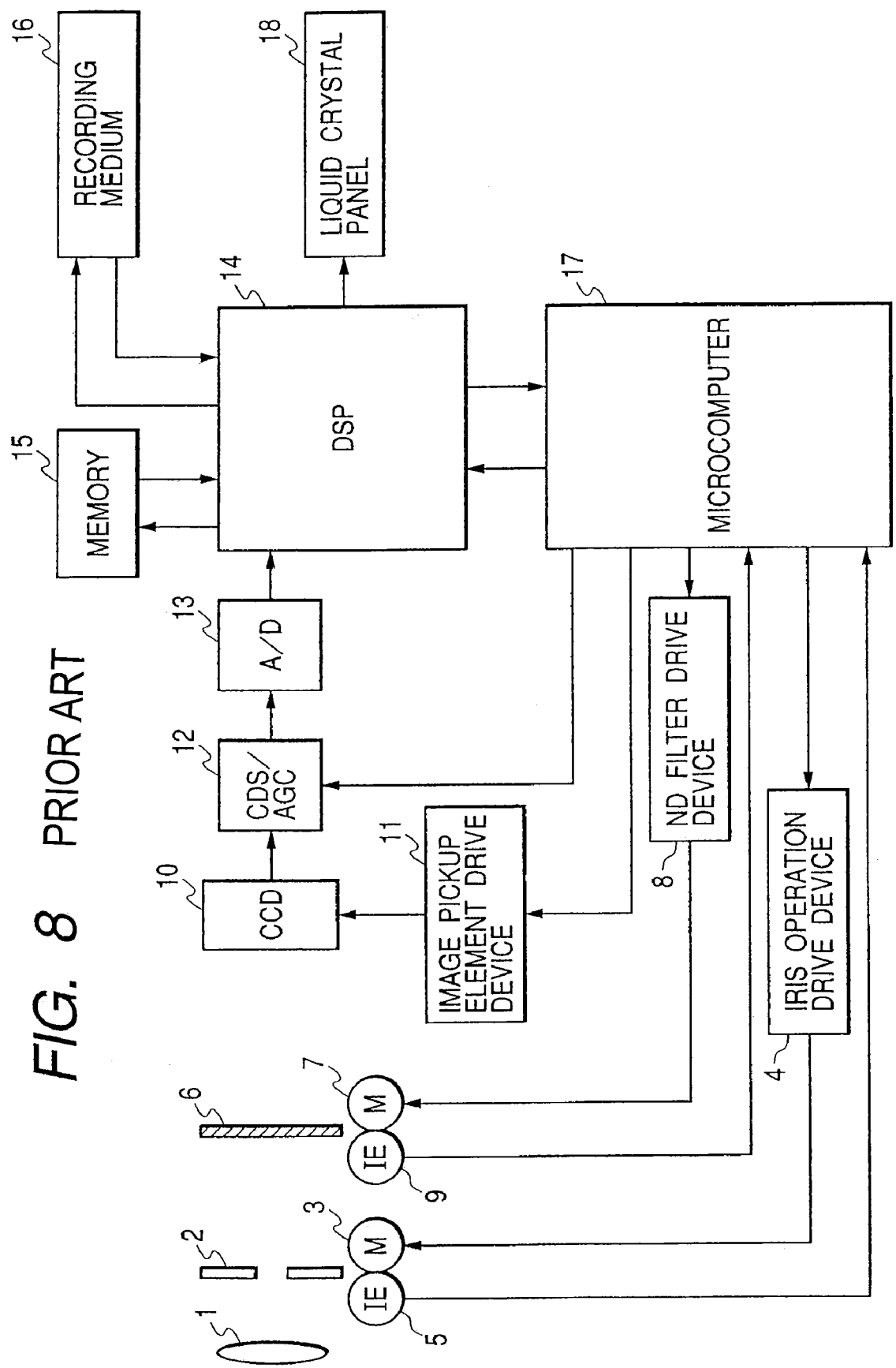
FIG. 8 is a block diagram showing a configuration of a conventional image pickup apparatus.

A different point of the configuration of the image pickup apparatus in the first embodiment from that of the prior art shown in FIG. 8, is that a moving image photographing mode and a still image photographing mode are changed over by connecting a moving/still image changeover switch 19 to a microcomputer 17.

To start with, for the moving image, an ND filter 6 having a single density as in the case of the prior art is consecutively advanced towards and withdrawn from an aperture diameter of an iris mechanism 2. Herein, when the photographing mode is changed over to the still image photographing mode from the moving image photographing mode by the moving/still image changeover switch 19, the microcomputer 17 calculates an accumulated charge amount EV of an object when changed over. It is determined based on the calculated EV value whether the ND filter 6 is fully advanced towards or fully withdrawn from the aperture diameter of the iris mechanism 2. Then, the microcomputer 17 controls an ND filter drive mechanism 8, thereby controlling the ND filter 6. Thereafter, an exposure is controlled under AGC (Automatic Gain Control) by use of the iris mechanism 2 and an electronic shutter, depending on brightness of the object.

Exposure Control in First Embodiment

Figure 2:
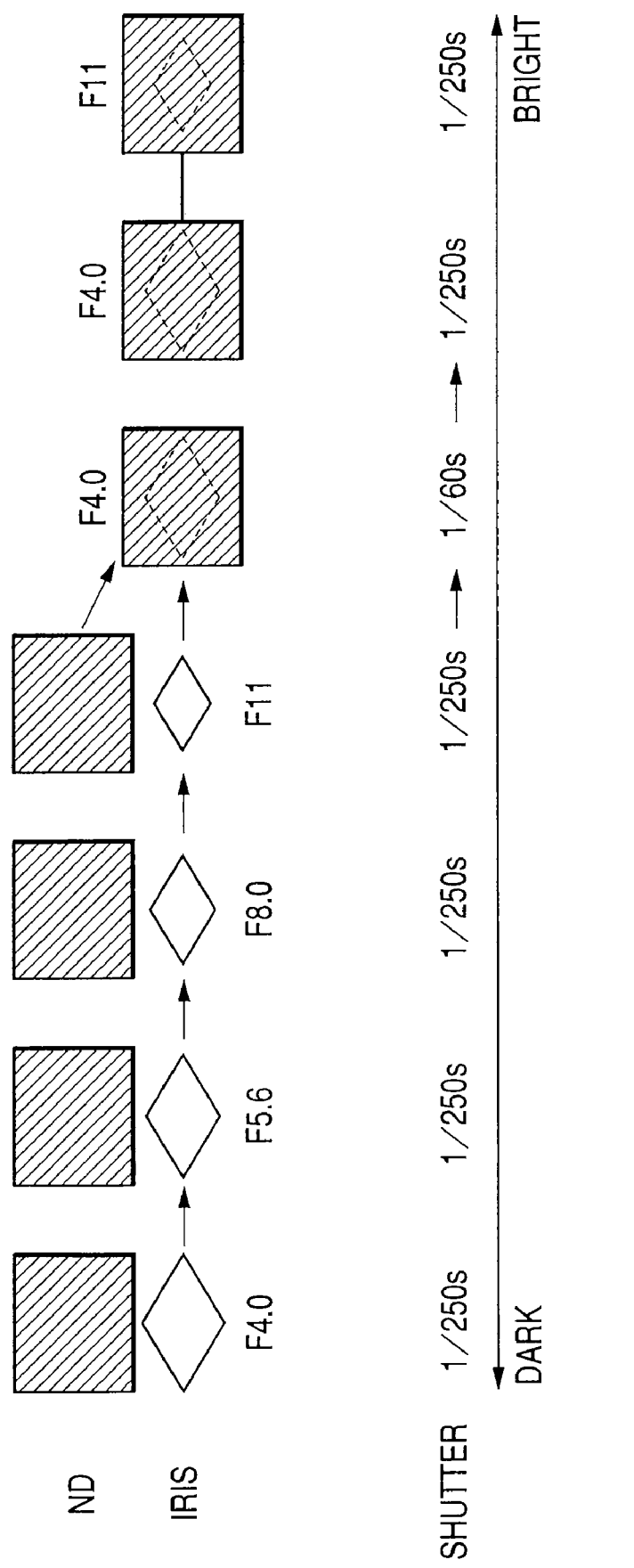
FIG. 2 is a diagram showing how an exposure is controlled in the first embodiment.

Next, a process from the full-withdrawing of the ND filter 6 from the aperture diameter of the iris mechanism to the full-advancing thereof in the still image photographing mode, will be described with reference to FIG. 2 showing an exposure control diagram in the first embodiment.

As illustrated in FIG. 2, as the object becomes brighter, the iris mechanism 2 closes up (stops down), and the control of the iris mechanism 2 is halted just when the aperture diameter comes to F11. Subsequently the control is conducted so that the ND filter 6 fully covers the aperture diameter of the iris mechanism 2. At this time, the iris mechanism 2 expands (opens) the aperture diameter to an extent corresponding to a density of the ND filter 6 in order to compensate the light shielded by the ND filter 6. The light that cannot be completely compensated by expanding the aperture diameter of the iris mechanism 2, is further compensated by lowering a shutter speed of the electronic shutter. Namely, the incompletely-compensated light is compensated by elongating an accumulation time of accumulating the light on a CCD (Charge-Coupled Device) 10. This compensation control enables an abrupt change in amount of light due to the advancing of the ND filter 6 to become inconspicuous.

According to the first embodiment, the ND filter 6 has 5-level light shielding capabilities. The iris mechanism has 3-level light shielding capabilities from F11 up to F4, and difference of two levels between the 5-level and the 3-level is compensated by controlling the shutter speed of the electronic shutter by the two levels in the brighter direction from 1/250 sec to 1/60 sec. Thereafter, if the brightness of the object becomes much higher, the shutter speed of the electronic shutter is set higher up to 1/250 sec from 1/60 sec, and the aperture diameter of the iris mechanism is closed up (narrowed down) to an aperture diameter of F11 from an aperture diameter of F4, thus controlling the exposure.

Inversely, an exposure control method of fully withdrawing the ND filter 6 from the state where the ND filter 6 has fully been advanced towards the aperture diameter of the iris mechanism 2, is that the exposure is controlled in a darkening direction of the object as opposed to the aforementioned brightening direction thereof. Namely, in the state where the ND filter 6 is fully advanced towards the aperture diameter of the iris mechanism 2, upon reaching such conditions that the shutter speed of the electronic shutter is 1/60 sec, the iris mechanism 2 comes to the aperture diameter of F4 and the microcomputer 17 judges that the object is dark, the shutter speed of the electronic shutter is set at 1/250 sec, and the iris mechanism 2 closes up (stops down) to the aperture diameter of F11, wherein the ND filter 6 is fully withdrawn from the aperture diameter of the iris mechanism 2. Thereafter, when the object further darkens, the exposure is controlled by the shutter speed of the electronic shutter and the iris mechanism 2.

Drive Control Method of ND Filter 6 in First Embodiment

Figure 3:
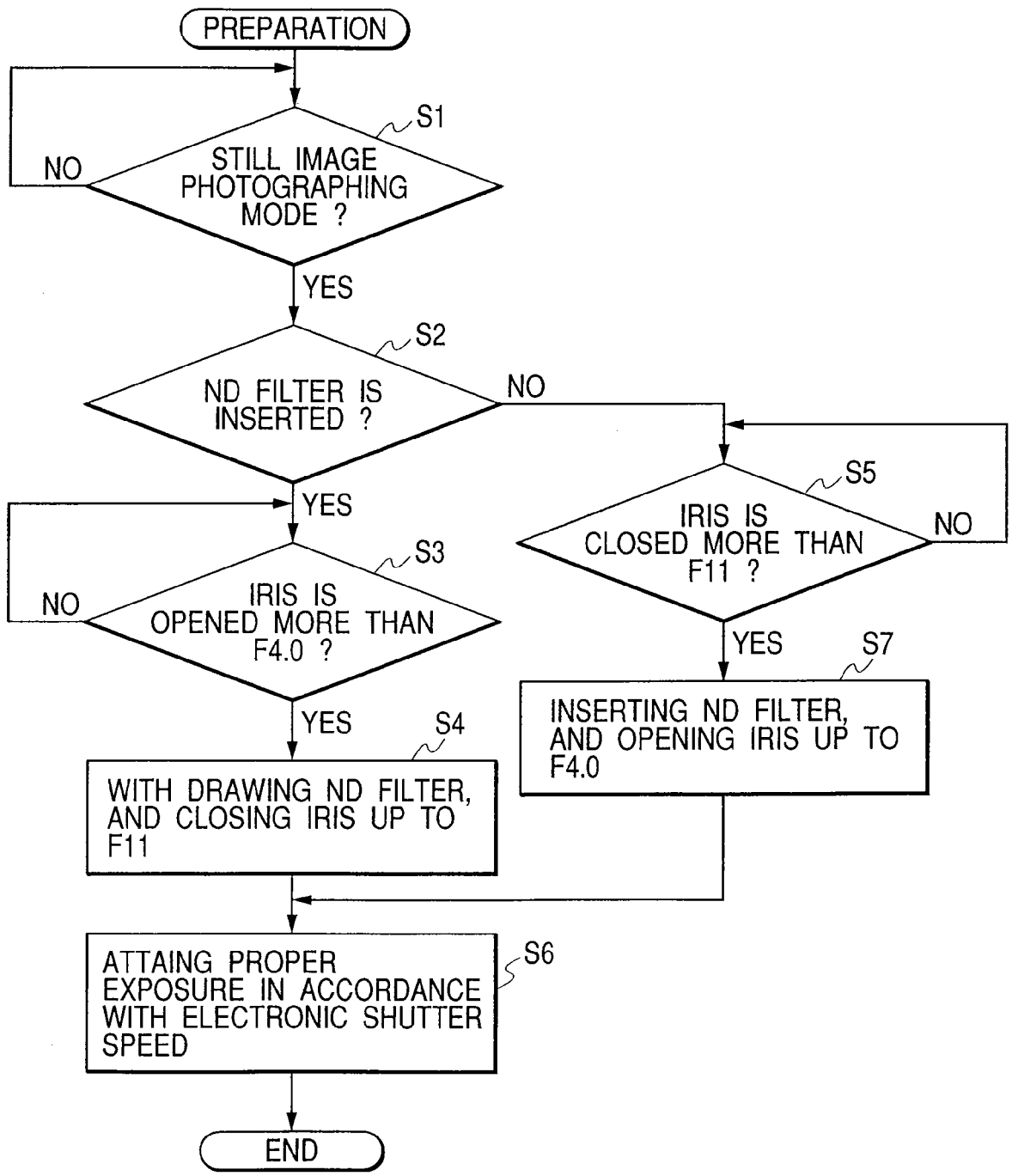
FIG. 3 is a flowchart showing a drive control method of an ND filter in the first embodiment.

Next, a drive control method of the ND filter 6 in the first embodiment will be discussed with reference to a flowchart in FIG. 3. Note that a program based on the flowchart in FIG. 3 is stored on a storage device within the microcomputer 17 and runs on the microcomputer 17, whereby the following control method can be actualized.

To begin with, it is judged in step S1 whether the mode is the still image photographing mode or not. If judged to be the still image photographing mode, the processing proceeds to step S2. Whereas if not, the processing is not executed until the mode is judged to be the still image photographing mode.

It is judged in step S2 whether the ND filter 6 is now in a state of being advanced or withdrawn. If the ND filter 6 is advanced, the processing advances to step S3. Whereas if withdrawn, the processing proceeds to step S5.

When judging in step S2 that the ND filter 6 is advanced, and the processing advances to step S3, wherein it is judged whether the iris is opened wider than F4.0. If opened wider than F4.0, the processing proceeds to step S4. Whereas if not opened wider than F4.0, there is a wait in step S3 till the iris is opened wider than F4.0.

When advancing to step S4, the ND filter 6 is withdrawn, and the iris mechanism 2 closes up (stops down) to F11. Thereafter, the processing proceeds to step S6, wherein a proper exposure is attained by changing the shutter speed.

When judging in step S2 that the ND filter 6 is withdrawn, and the processing advances to step S5, wherein it is judged whether the iris is closed up narrower than F11. If closed up narrower than F11, the processing proceeds to step S7. Whereas if not closed up narrower than F11, there is a wait in step S5 till the iris is closed up narrower than F11.

When advancing to step S7, the ND filter 6 is advanced, and the iris mechanism 2 is opened up to F4.0. Thereafter, the processing proceeds to step S6, wherein the proper exposure is acquired by changing the shutter speed.

Thus, the first embodiment, when photographing the still image, adopts not the operation of consecutively inserting the ND filter 6 towards the aperture diameter of the iris but the operation of performing the control as to whether the ND filter 6 is fully advanced or withdrawn. Namely, the ND filter 6 is not advanced towards the aperture diameter of the iris till the iris mechanism 2 reaches a certain given aperture diameter of the iris, and further, in the case of desiring to reduce an amount of incident light, the ND filter 6 is advanced so as to cover the entire aperture diameter of the iris mechanism 2. Thus, in the still image photography, the ND filter 6 is utilized, thereby preventing a decline of an image resolution due to a diffraction of the light that occurs when the ND filter 6 is in the state of neither being fully withdrawn from the aperture diameter of the iris mechanism 2 nor fully covering the aperture diameter, and further making it possible to ensure the same dynamic range of the exposure control as the moving image has.

Second Embodiment

Figure 4:
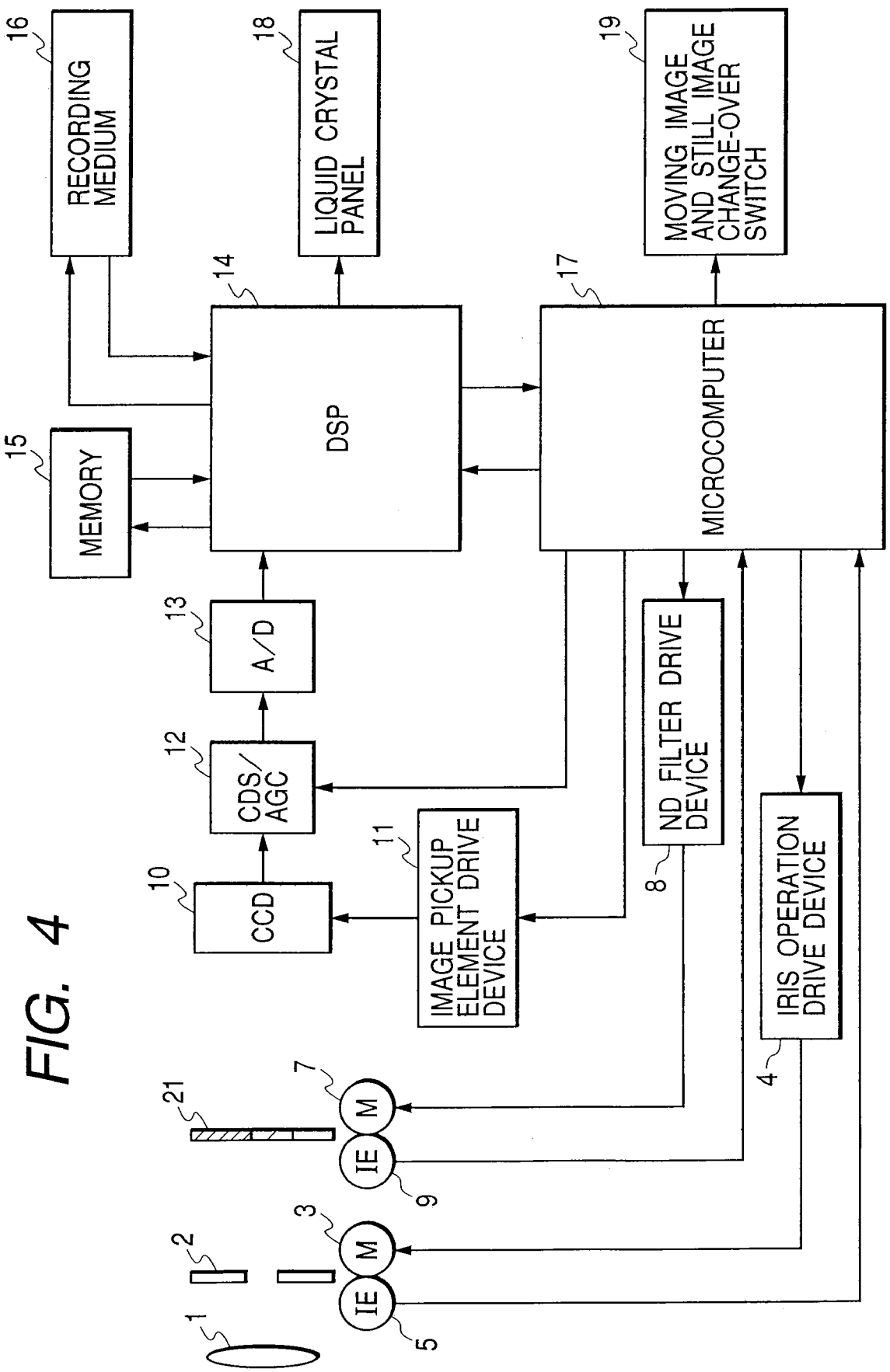
FIG. 4 is a block diagram showing a configuration of the image pickup apparatus in a second embodiment of the present invention.

FIG. 4 is a block diagram showing a configuration of the image pickup apparatus according to a second embodiment of the present invention, the components marked with the same numerals as those in the block diagram (FIG. 1) in the first embodiment, are component blocks having the same functions as those in the first embodiment, and hence their repetitive explanations are herein omitted.

A different point of the configuration of the image pickup apparatus in the second embodiment from that in the first embodiment, is that a multi-density ND filter 21 exhibiting a plurality of densities is used as a substitute for the single-density ND filter 6.

Figure 5:
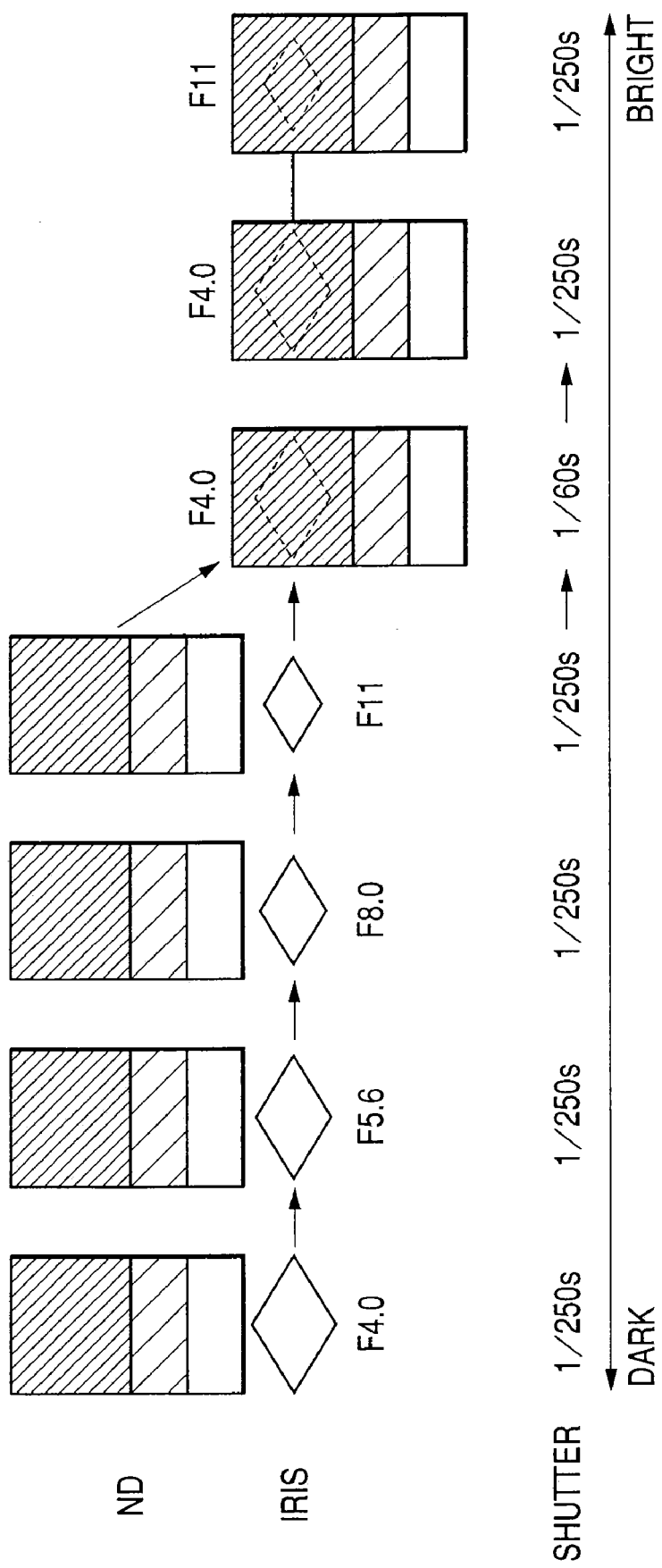
FIG. 5 is a diagram showing how the exposure is controlled in the second embodiment.

Next, a process from the state of the full-withdrawing of a multi-density ND filter 21 from the aperture diameter of the iris mechanism 2 to the full-advancing thereof in the still image photographing mode, will be described with reference to FIG. 5 showing an exposure control diagram in the second embodiment.

As illustrated in FIG. 5, as the object becomes brighter, the iris mechanism 2 closes up, the control of the iris mechanism 2 is halted at the aperture diameter of F11, and subsequently the multi-density ND filter 21 is controlled so that a highest-density area of the multi-density ND filter 21 covers the entire aperture diameter of the iris mechanism 2.

Then, in order for the iris mechanism 2 to compensate the light shielded by the multi-density ND filter 21, the aperture diameter of the iris mechanism 2 opens (expands) so that different density areas of the ND filter 21 do not exist at the aperture diameter of the iris mechanism 2. At this time, the light that can not be completely compensated by expanding the aperture diameter of the iris mechanism 2, is further compensated by lowering the shutter speed of the electronic shutter in the same way as the first embodiment takes.

In the second embodiment, the multi-density ND filter 21 has the 5-level light shielding capabilities. The iris mechanism 2 has 3-level light shielding capabilities from F11 up to F4, and hence difference of two levels between the 5-level and the 3-level is compensated by controlling the shutter speed of the electronic shutter by the two levels from 1/250 sec to 1/60 sec in the brighter direction. Thereafter, if the brightness of the object becomes much higher, as in the first embodiment, the shutter speed of the electronic shutter is set higher up to 1/250 sec from 1/60 sec, and the aperture diameter of the iris mechanism narrows down to an aperture diameter of F11 from an aperture diameter of F4, thus controlling the exposure.

Inversely, an exposure control method of fully withdrawing the multi-density ND filter 21 from the state where the multi-density filter 21 has fully been advanced towards the aperture diameter of the iris mechanism 2, is that the exposure is controlled in the darkening direction of the object as opposed to the aforementioned brightening direction of the object.

As discussed above, the second embodiment, in the still image photography of the image pickup apparatus incorporating the ND filter 21 having the plurality of densities, adopts not the operation of consecutively inserting the ND filter 21 towards the aperture diameter of the iris but the operation of performing the control as to whether the ND filter 21 is fully advanced or withdrawn. Namely, the ND filter 21 is not advanced towards the aperture diameter of the iris till the iris mechanism 2 reaches a certain given aperture diameter of the iris, and further, in the case of desiring to reduce an amount of incident light, the ND filter 21 is advanced so as to cover the entire aperture diameter of the iris mechanism 2 with the single-density area of the ND filter 21. Thus, in the still image photography, the ND filter 21 is utilized, thereby preventing the decline of the image resolution due to the diffraction of the light that occurs when the ND filter 21 is in the state of neither being fully withdrawn from the aperture diameter of the iris mechanism 2 nor fully covering the aperture diameter, and due to the diffraction of the light that occurs when the ND filter 21 is in a state of fully covering the aperture diameter of the iris mechanism 21 with a different-density-mixed area of the ND filter 21, and further making it possible to ensure the same dynamic range of the exposure control as the moving image has.

Third Embodiment

Figure 6:
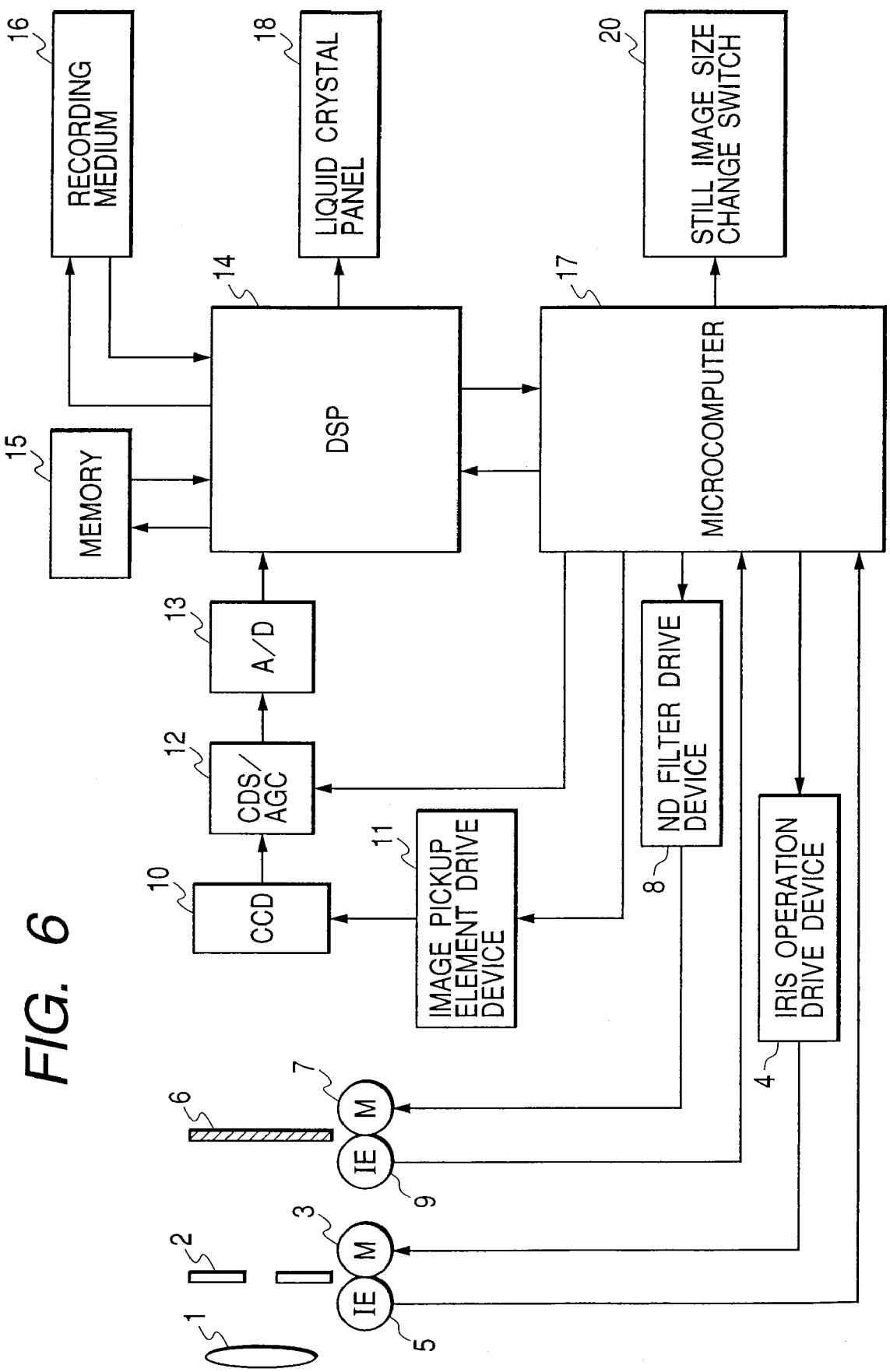
FIG. 6 is a block diagram showing a configuration of the image pickup apparatus in a third embodiment of the present invention.

FIG. 6 is a block diagram showing a configuration of the image pickup apparatus according to a third embodiment of the present invention, the components marked with the same numerals as those in the block diagram (FIG. 8) in the prior art, are component blocks having the same functions as those in the prior art, and hence their repetitive explanations are herein omitted.

A different point of the configuration of the image pickup apparatus in the third embodiment from that in the prior art illustrated in FIG. 8, is that a still image size change switch 20 connected to the microcomputer 17 changes an image size of the still image.

Figure 7A:
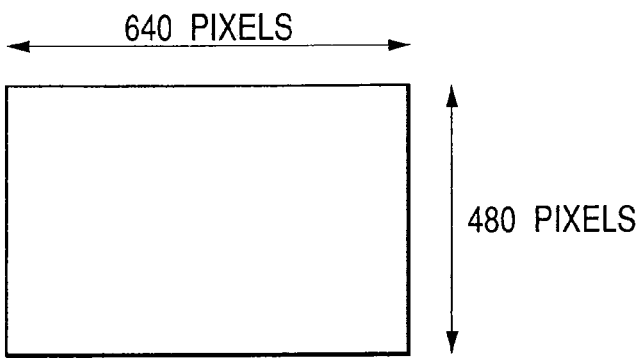
FIGS. 7A and 7B are diagrams showing image sizes in the third embodiment.

At first, when the still image size change switch 20 selects a comparatively small still image size (e.g., 640×480 pixels: see FIG. 7A) exhibiting a low resolution, as in the prior art, the ND filter 6 is consecutively advanced towards or withdrawn from the aperture diameter of the iris mechanism 2.

Figure 7B:
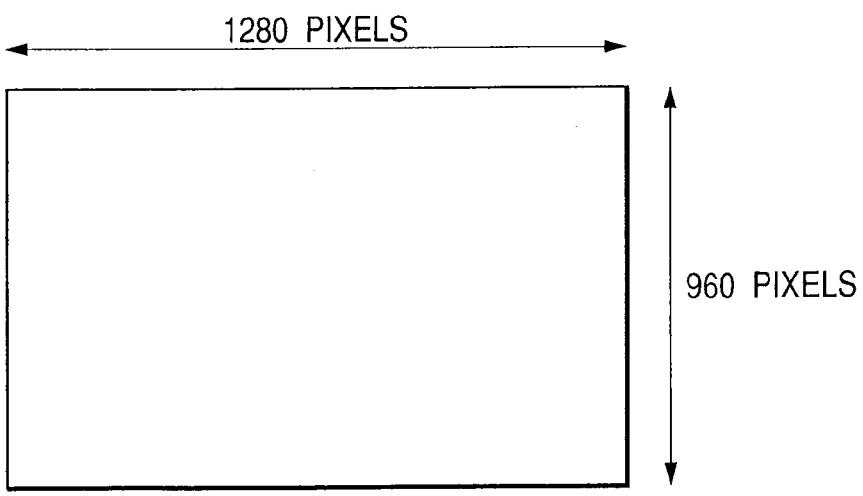

Herein, the change switch 20, upon a changeover from a low resolution mode to a high resolution mode, selects a comparatively large still image size (e.g., 1,280×960 pixels: see FIG. 7B) as an image size. Then, the microcomputer 17 calculates an accumulated charge amount EV of the object when changed over, thereby determining based on the thus calculated EV value whether the ND filter 6 is fully advanced towards or fully withdrawn from the aperture diameter of the iris mechanism 2. Then, the microcomputer 17 controls the ND filter 6 by controlling the drive mechanism 8 for the ND filter 6. Thereafter, the exposure is controlled under the AGC by use of the iris mechanism 2 and the electronic shutter, depending on the brightness of the object.

Note that the third embodiment has exemplified the single-density ND filter 6 and may also take the configuration involving the use of the multi-density ND filter 21 as exemplified in the second embodiment. In the high resolution mode, the processing from the state where the ND filter 6 and the multi-density ND filter 21 are fully withdrawn from the aperture diameter of the iris mechanism 2 to the full advancing thereof towards aperture diameter, or the processing from the state where the ND filter 6 and the multi-density ND filter 21 are fully advanced towards the aperture diameter of the iris mechanism 2 to the full-withdrawing thereof, are the same as those in the first embodiment and the second embodiment.

Thus, the image pickup apparatus according to the third embodiment has the mode in which the image exhibiting the high-quality though the image recording size becomes comparatively large can be captured in the still image photography, and also has the image size changeover function capable of reducing the image size though the image quality becomes low. This image pickup apparatus takes the control method of controlling the ND filter 6 in the two ways of advancing and withdrawing the ND filter 6 as described above when selecting the high-quality image photography given a priority of the image-quality, and when selecting the low-quality image photography given a priority of the image size, changes the control method to that of consecutively the ND filter 6 in the same manner as in the moving image photography. With this changeover of the control methods, the exposure can be controlled smoothly with no abrupt change in luminance in the low-quality image photography, and the decline of the resolution of the still image can be prevented in a way that does not narrow the dynamic range of the exposure control in the high-quality image photography.

The present invention may be, without being limited to the apparatuses in the embodiments discussed above, applied to a system configured by a plurality of appliances and also to an apparatus constructed of one single appliance. The present invention is, as a matter of course, accomplished by supplying the system or the apparatus with a storage medium stored with software program codes for actualizing the functions in the embodiments discussed above, and making a computer (or a CPU and an MPU) of the system or the apparatus read and execute the program codes stored on the storage medium.

In this case, it follows that the program codes themselves, which have been read from the storage medium, actualize the functions in the embodiments discussed above, and that the storage medium stored with the program codes configures the present invention. The storage medium for supplying the program codes may involve using, for example, a floppy (registered trademark) disk, a hard disk, an optical disk, a magneto-optic disk, a CD-ROM, a CD-R, a magnetic tape, a nonvolatile memory card and a ROM. In addition to the case where the computer executes the readout program codes and the functions in the embodiments discussed above are thereby actualized, the present invention, needless to say, further includes a case in which the OS, etc. running on the computer executes a part or the whole of the actual processing on the basis of the instructions of the program codes, and the functions in the embodiments discussed above are actualized by such processing.

Moreover, the program codes read from the storage medium are written to a memory provided in a function extended board advanced into the computer and in a function extended unit connected to the computer, thereafter a CPU, etc. provided in the extended board or the extended unit executes processing of these extended functions on the basis of the subsequent instructions of the next program codes and thus executes a part or the whole of the actual processing, and the functions in the embodiments discussed above are actualized by such processing.

As discussed so far in detail, according to the present invention, the method of driving the filter unit is changed according to the still image photography and the moving image photography, thereby making it possible to prevent the decline of the resolution of the still image in a way that does not narrow the dynamic range of the exposure control.

Moreover, the filter unit driving method is changed according to the still image size, and it is therefore feasible to prevent the decline of the resolution of the still image in a way that does not narrow the dynamic range of the exposure control in the high-resolution image photography and to perform the smooth exposure control in the low-resolution image photography.

The present invention is not limited to the above embodiment and various changes and modifications can be made within the spirit and scope of the present invention. Therefore, to apprise the public of the scope of the present invention, the following claims are made.

What is claimed is:

1. An image pickup apparatus, capable of photographing in a first mode for recording a plurality of frames and a second mode for recording one frame in accordance with a predetermined action, comprising:
    an iris mechanism that changes an amount of light with which an image pickup element is irradiated, by changing an aperture diameter;
    a filter unit, having a plurality of densities, that changes an amount of light input;
    a unit that drives said iris mechanism and said filter unit, independently;
    an image size changing unit that changes a size of an image to be photographed in the second mode; and
    a control unit that sets said filter unit in one of a state of covering the aperture diameter of said iris mechanism and a state of withdrawing from the aperture diameter of said iris mechanism in a case where a predetermined image size is designated by said image size changing unit,
    wherein said control unit performs drive control of said filter unit so that said filter unit is driven from the state of withdrawing from the aperture diameter of said iris mechanism to the state of covering the whole of the aperture diameter when a predetermined image size is designated by said image size changing unit, the aperture diameter of said iris mechanism is changed so as to be opened in the second mode, and the aperture diameter reaches a predetermined aperture diameter.

2. An image pickup apparatus, capable of photographing in a first mode for recording a plurality of frames and a second mode for recording one frame in accordance with a predetermined action, comprising:
    an iris mechanism that changes an amount of light with which an image pickup element is irradiated, by changing an aperture diameter;
    a filter unit, having a plurality of densities, that changes an amount of light input;
    a unit that drives said iris mechanism and said filter unit, independently;
    an image size changing unit that changes a size of an image to be photographed in the second mode; and
    a control unit that sets said filter unit in one of a state of covering the aperture diameter of said iris mechanism and a state of withdrawing from the aperture diameter of said iris mechanism in a case where a predetermined image size is designated by said image size changing unit,
    wherein said control unit performs drive control of said filter unit so that said filter unit withdraws from the state of covering the aperture diameter when a predetermined image size is designated by said image size changing unit, the aperture diameter of said iris mechanism is changed so as to be closed up in the second mode, and the aperture diameter reaches a predetermined aperture diameter.

3. A control method of an image pickup apparatus capable of photographing in a first mode for recording a plurality of frames and a second mode for recording one frame in accordance with a predetermined action, said control method comprising:
    a driving step of driving an iris mechanism and a filter unit of the image pickup apparatus, independently, wherein the iris mechanism is driven to change an amount of light with which an image pickup element is irradiated, by changing an aperture diameter of the iris mechanism, and wherein the filter unit has a plurality of densities and is driven to change an amount of light input;
    an image size changing step of changing a size of an image to be photographed in the second mode; and
    a control step of controlling said driving step to set the filter unit in one of a state of covering the aperture diameter of the iris mechanism and a state of withdrawing from the aperture diameter of the iris mechanism in a case where a predetermined image size is designated in said image size changing step,
    wherein said control step includes the step of performing drive control of the filter unit so that:
        the filter unit is driven from the state of withdrawing from the aperture diameter of the iris mechanism to the state of covering the whole of the aperture diameter when a predetermined image size is designated in said image size changing step,
        the aperture diameter of the iris mechanism is changed so as to be opened in the second mode, and
        the aperture diameter reaches a predetermined aperture diameter.

4. A control method of an image pickup apparatus capable of photographing in a first mode for recording a plurality of frames and a second mode for recording one frame in accordance with a predetermined action, said control method comprising:
    a driving step of driving an iris mechanism and a filter unit of the image pickup apparatus, independently, wherein the iris mechanism is driven to change an amount of light with which an image pickup element is irradiated, by changing an aperture diameter of the iris mechanism, and wherein the filter unit has a plurality of densities and is driven to change an amount of light input;

an image size changing step of changing a size of an image to be photographed in the second mode; and a control step of controlling said driving step to set the filter unit in one of a state of covering the aperture diameter of the iris mechanism and a state of withdrawing from the aperture diameter of the iris mechanism in a case where a predetermined image size is designated in said image size changing step, wherein said control step includes performing drive control of the filter unit so that:

the filter unit is withdrawn from the state of covering the aperture diameter when a predetermined image size is designated in said image size changing step, the aperture diameter of the iris mechanism is changed so as to be closed up in the second mode, and the aperture diameter reaches a predetermined aperture diameter.

* * * * *